Aug. 26, 1958     D. WALOFF ET AL     2,849,630
ELECTRICAL GENERATORS
Filed Nov. 29, 1955
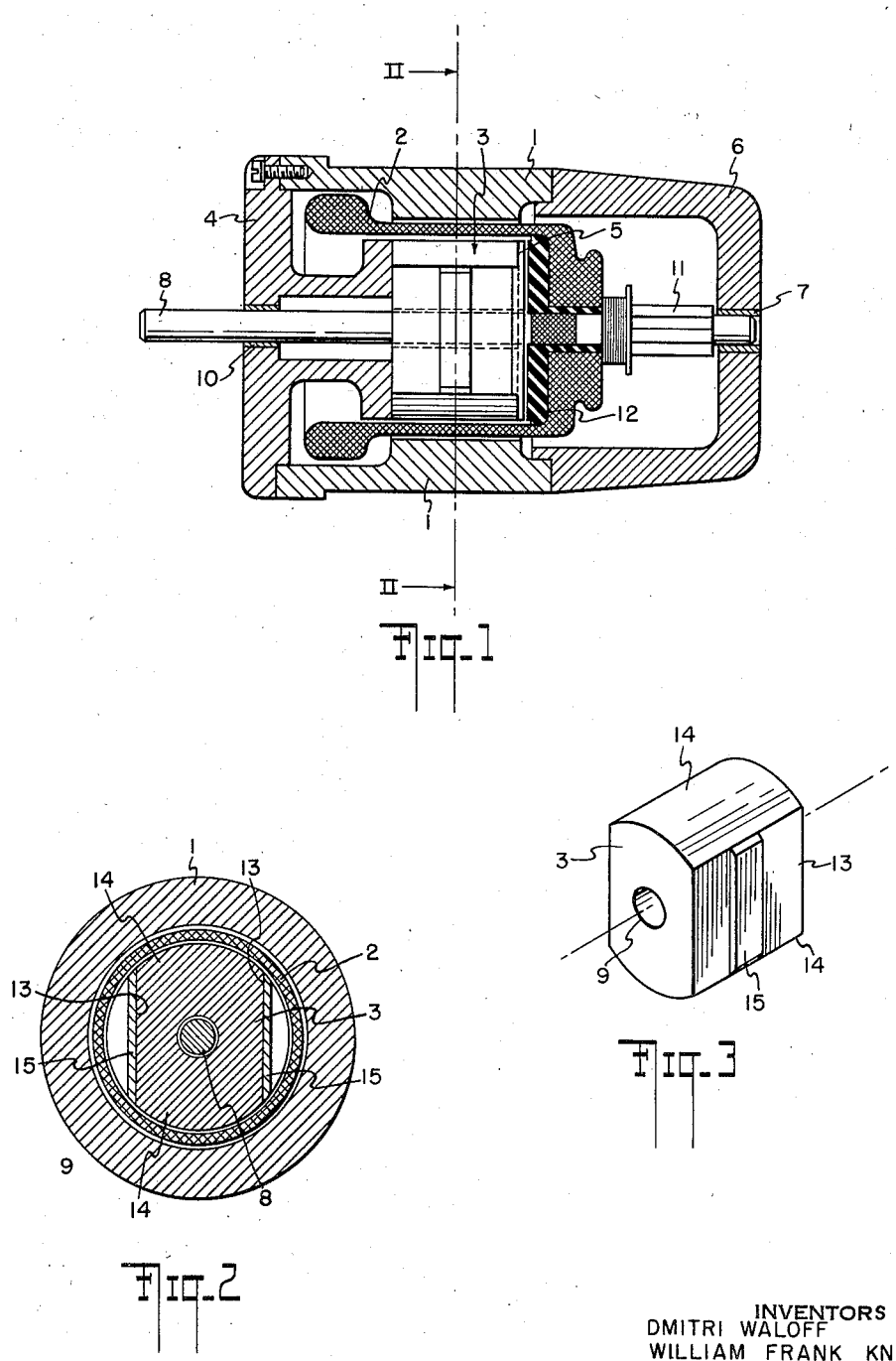
INVENTORS
DMITRI WALOFF
WILLIAM FRANK KNIGHT
BY
Herbert H. Thompson
ATTORNEY United States Patent Office 2,849,630
Patented Aug. 26, 1958

2,849,630

ELECTRICAL GENERATORS

Dmitri Waloff, London, and William Frank Knight, Ashford, England, assignors to The Sperry Gyroscope Company Limited, Brentford, England, a company of Great Britain Application November 29, 1955, Serial No. 549,786

Claims priority, application Great Britain September 1, 1955

2 Claims. (Cl. 310—154)

This invention relates to electrical generators for example generators for use as tachometers.

A tachometer is usually used for indicating the speed of rotation of a shaft to which it is coupled, the output voltage being a measure of the speed of rotation.

However, most tachogenerators have the disadvantage that the output voltage corresponding to any given speed varies slightly with change of temperature of the tachogenerator due, for example, to change of the strength of the magnet, to change in dimension of the air-gaps in the magnetic air circuit or to changes of other magnetic properties of the magnetic circuit or combinations of these changes.

An object of the present invention is to provide a generator in which the effects of temperature changes on the electrical output are substantially reduced.

In accordance with the invention, the magnetic shunt is provided by flat metallic pieces or strips held by cement to the flat faces of the permanent magnet, the shunt having a positive temperature co-efficient of reluctance.

The magnetic shunt reduces the resultant strength of the magnet by diversion of magnetic flux but as the temperature changes, the flux diversion may be arranged to vary in such manner as to maintain the resultant strength of the magnet substantially constant and thereby compensate for temperature variations in the actual strength of the magnet and in other properties of the magnetic circuit.

In order that the invention may readily be carried into effect, an embodiment will now be described, by way of example, with reference to the accompanying drawing in which:

Figure 1 shows a part cross-sectional view of a D. C. tachogenerator.

Figure 2 shows a cross-section taken at II—II of Figure 1 and

Figure 3 shows a perspective view of the magnet and a shunt.

The tachogenerator comprises a stationary annular yoke 1 of magnetic material, a rotatable self-supporting cup-shaped wound rotor 2 and a stationary permanent magnet 3. Yoke 1 is provided with a non-magnetic closure unit 4 to which is secured magnet 3 by means of a non-magnetic end plate 5 and bolts (not shown). The annular yoke 1 and magnet 3 provide the flux conducting stator of the tachogenerator.

A second closure unit 6 is provided to yoke 1, which unit 6 carries a bearing 7 for a shaft 8 which passes through a hole 9 in magnet 3 to a further bearing 10 supported in unit 4. To shaft 8 there are secured rotor 2 and a commutator 11 by means of electrically non-conductive cement and a moulded driving plate 12. Commutator 11 is electrically connected to rotor 2 and cooperates with brushes (not shown) to provide an output voltage which is proportional to the speed of rotation of shaft 8.

Magnet 3 has the form of a segmental cylinder provided with two diametrically opposite plane faces 13, 13, the remaining cylindrical surface portions 14, 14, acting as salient poles. To each face 13 there is secured by cement, a magnetic shunt 15, which has a positive temperature co-efficient of reluctance.

Part of the flux of magnet 3 is diverted through the two shunts 15, 15 so that rotor 2 which rotates through the two gaps between the poles magnet 3 and yoke 1 does not cut the diverted flux. As the temperature rises, and consequently the strength of magnet 3 decreases and possibly the widths of the gaps increase, the reluctance of the shunts 15, 15 also increases and therefore less flux is diverted with the result that the field strength in the gaps is maintained substantially constant. In this way, the substantially open-circuit output voltage of the tachogenerator may be maintained substantially constant with varying temperature (e. g. 10:1 reduction in the variation of the output voltage with temperature over the range of 0° C. to 75° C.).

As an example, a 1.125 inch diameter cylindrical magnet 0.75 inch long provided with plane faces 0.69 inch apart and made of magnetic steel available under the trade-name "Alcomax III" required a strip of ferro-nickel alloy available under the trade-name Telcon R. 2799 (Fe 29.5%; Ni) secured to each plane face as indicated in Figure 3. Each strip was 0.25 inch wide and 0.020 inch thick.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A tachogenerator comprising a flux conducting stator including an external annular yoke and a permanent magnet having the shape of a segmental cylinder with two diametrically opposite, substantially parallel flat faces and two salient poles fixedly located within the yoke with its axis coaxial with the axis of the yoke, a flat metallic piece cemented to each of the respective flat faces of the magnet extending between the salient poles thereof to provide a temperature compensating shunt for the stator, and a wound cup-shaped rotor coaxial with the yoke extending within the gap provided in the stator between the yoke and magnet.

2. In a tachogenerator, a flux conducting stator including an external annular yoke and a permanent magnet having the shape of a segmental cylinder with two diametrically opposite, substantially parallel flat faces and two salient poles fixedly located within the yoke with its axis coaxial with the axis of the yoke, said magnet having ferro-nickel alloy strips cemented to the respective flat faces thereof extending between its poles to provide a temperature compensating shunt.

References Cited in the file of this patent

UNITED STATES PATENTS

| | | |
|---|---|---|
| 1,608,872 | Wallis | Nov. 30, 1926 |
| 2,193,675 | Merrill | Mar. 12, 1940 |
| 2,245,268 | Gross et al. | June 10, 1941 |
| 2,725,493 | Mitchel et al. | Nov. 29, 1955 |

FOREIGN PATENTS

| | | |
|---|---|---|
| 883,171 | Germany | Aug. 31, 1953 |